US010608484B2

(12) United States Patent
Luise et al.

(10) Patent No.: US 10,608,484 B2
(45) Date of Patent: Mar. 31, 2020

(54) ELECTRIC MOTORS (71) Applicant: Nidec ASI S.p.A., Cinisello Balsamo MI (IT)

(72) Inventors: Fabio Luise, Venice (IT); Stefano Pieri, Ronchi dei Legionari (IT)

(73) Assignee: NIDEC ASI S.p.A., Cinisello Balsamo (MI) (IT)

( * ) Notice: Subject to any disclaimer, the term of this patent is extended or adjusted under 35 U.S.C. 154(b) by 384 days.

(21) Appl. No.: 15/591,497

(22) Filed: May 10, 2017

(65) Prior Publication Data

US 2017/0338701 A1 Nov. 23, 2017

(30) Foreign Application Priority Data

May 13, 2016 (EP) ..................................... 16169715

(51) Int. Cl.
*H02K 1/20* (2006.01)
*H02K 5/128* (2006.01)
(Continued)

(52) U.S. Cl.
CPC ........... *H02K 1/20* (2013.01); *F04D 29/5806* (2013.01); *H02K 1/02* (2013.01); *H02K 1/16* (2013.01);
(Continued)

(58) Field of Classification Search
CPC .......... H02K 1/20; H02K 5/1285; H02K 9/12; H02K 9/128; F04D 13/06506; F04D 29/5806; F04B 39/0223; F04B 39/023
(Continued)

(56) References Cited

U.S. PATENT DOCUMENTS 4,347,451 A 8/1982 Mizuyama et al.
6,265,801 B1 * 7/2001 Hashiba ................. H02K 1/165
310/156.28
(Continued)

FOREIGN PATENT DOCUMENTS

DE 30 15 435 A1 10/1980
EP 1 826 887 A2 8/2007
(Continued)

OTHER PUBLICATIONS

European Search Report for corresponding European Patent Application No. 16169715.6 dated Nov. 16, 2016, 5 pages.

*Primary Examiner* — Philip E Stimpert
(74) *Attorney, Agent, or Firm* — MH2 Technology Law Group LLP (57) ABSTRACT An electric motor may include: a stator; a rotor; and a tubular sleeve. The stator may have a stator cavity with an axis extending in a longitudinal direction. The stator cavity may have a stator inlet for receiving a fluid and a stator outlet for discharging the fluid. The rotor may be arranged inside the stator cavity and be rotatable around the axis. The tubular sleeve may be arranged between the stator and the rotor, coaxial with the axis, and attached to the stator through attachment members. The tubular sleeve may be spaced from the stator by a first tubular gap, and from the rotor by a second tubular gap. The first tubular gap may extend along the longitudinal direction between a first gap inlet and a first gap outlet. The second tubular gap may extend along the longitudinal direction between a second gap inlet and a second gap outlet.

20 Claims, 4 Drawing Sheets (51) Int. Cl.
*H02K 9/12* (2006.01)
*F04D 29/58* (2006.01)
*H02K 1/02* (2006.01)
*H02K 1/16* (2006.01)
*H02K 7/14* (2006.01)
*H02K 9/00* (2006.01)

(52) U.S. Cl.
CPC .............. *H02K 5/1285* (2013.01); *H02K 7/14* (2013.01); *H02K 9/005* (2013.01); *H02K 9/12* (2013.01); *H02K 2005/1287* (2013.01)

(58) Field of Classification Search
USPC ............... 310/52, 54, 59, 60 R, 61–63, 60 A
See application file for complete search history.

(56) References Cited

U.S. PATENT DOCUMENTS

| | | | |
|---|---|---|---|
| 2007/0200438 A1* | 8/2007 | Kaminski | ............... F04D 1/063 310/54 |
| 2010/0079016 A1* | 4/2010 | Hemmelmann | ......... H02K 1/20 310/54 |
| 2016/0018148 A1* | 1/2016 | Yura | ....................... F25B 13/00 62/192 |

FOREIGN PATENT DOCUMENTS

| | | |
|---|---|---|
| EP | 2 040 353 A1 | 3/2009 |
| JP | 2001-231213 A | 8/2001 |
| WO | 01/091266 A1 | 11/2001 |
| WO | 2010/014647 A2 | 2/2010 |
| WO | 2011/099603 A1 | 8/2011 |
| WO | 2013/131820 A2 | 9/2013 |

* cited by examiner

ELECTRIC MOTORS

CROSS-REFERENCE TO RELATED APPLICATION(S)

This application claims priority under 35 U.S.C. § 119 from European Patent Application No. 16169715.6, filed on May 13, 2016, in the European Patent Office ("EPO"), the entire contents of which are incorporated herein by reference.

TECHNICAL FIELD

The present invention relates to an electric motor.

BACKGROUND OF THE INVENTION

The realisation of electric motors is known in the art, where a stator has a cylindrical cavity and a cylindrical rotor is arranged inside the stator cavity, the rotor being configured to rotate under the action of a magnetic field generated by the stator.

In some applications, the motor is immersed in a fluid, which flows also inside the gap separating the rotor from the stator. Due to the rotation of the rotor respect to the stator, the fluid flows in the gap in a turbulent way, generating friction losses and reducing the motor mechanical efficiency.

Moreover, the fluid in the gap gets overheated by friction, and raises the temperature of the whole motor, generating obvious problems. Friction power losses particularly increase if the fluid in the gap has a high viscosity and the motor rotates at a high speed.

This is particularly the case of apparatuses where electric motors are used to drive directly compressors and are arranged in a same housing with the compressor, for example in methane pipeline applications. In fact, such motors must rotate at a high speed, for example 10000 rpm, and the process gas flowing in the motor can be at high pressure, for example 80 bar to 100 bar, and consequently the gas has a high viscosity and generates high friction losses and a heat amount much higher than the common electromagnetically generated heat. Another application with similar problems is in refrigeration apparatuses, where the processed fluid, for example R134A, has a high viscosity at a pressure of 3 bar.

Because of this and other problems, the electric motors for driving compressors are often arranged in housings separated from the compressor housing, in order to avoid the fluid from flowing in the machine gap. However, this kind of solution does not ensure the fluid sealing of the compressor housing, which must have an opening to receive the drive shaft. Moreover, the sealing systems for the shaft brings to additional mechanical losses and to the consumption of the apparatus.

Otherwise, the motor flooded by the compressor process fluid must be provided with a strong cooling system, in particular in order to cool the stator of the motor, which is its most temperature sensitive part.

Document WO 2011099603 discloses a motor apparatus with a pump and an electric motor, where the liquid processed by the pump circulates also around the rotor. A can, made of materials with high resistance to pressure, temperature and erosion, completely enclose the stator, preserving it from contact with the turbulent and hot fluid.

In this document, a cooling system is provided in order to cool the stator chamber, the cooling system having a dedicated compressor and a dedicated fluid, which is separated from the process fluid and dissipates its heat in an external heat exchanger. Since the pressures of two distinct fluids apply on the surfaces of the can, a pressure balancing system must be provided, otherwise the can could be deformed or even broken.

However, such a balancing system requires high performances and high costs, since it may result not fast enough in compensating the pressure unbalance during a transient of the pump work. Moreover, any deformation of the can may result in problems for the sealing of the stator, eventually bringing to the mixing of the pump liquid and the cooling gas and therefore to the damaging of the compressor and the pump.

Other documents such as WO 2010014647, JP 2001231213 and WO 2013131820 disclose the possibility of enclosing a stator of an electrical machine in a can for its insulation from a turbulent fluid flowing around the rotor. However, all these documents face the problem of the pressure applied to the can by reinforcing the can or by trying to regulate an inner pressure of the can.

Object of the present invention is to provide an electric motor adapted to work in a fluid obviating the aforementioned prior art drawbacks, and an in-line motor-compressor apparatus with a simplified and reliable system for maintaining the stator temperature at acceptable values also when subject to high pressures or fast pressure variations.

SUMMARY OF THE INVENTION

These and other objects are fulfilled by an electric as defined in one or more of the accompanying claims.

BRIEF DESCRIPTION OF THE DRAWINGS

More features and advantages of the electric motor according to the present invention will result from the following detailed description of a preferred embodiment of the present invention, which is illustrated without limitation in the annexed drawings, wherein.

DETAILED DESCRIPTION OF THE INVENTION

Figure 1:
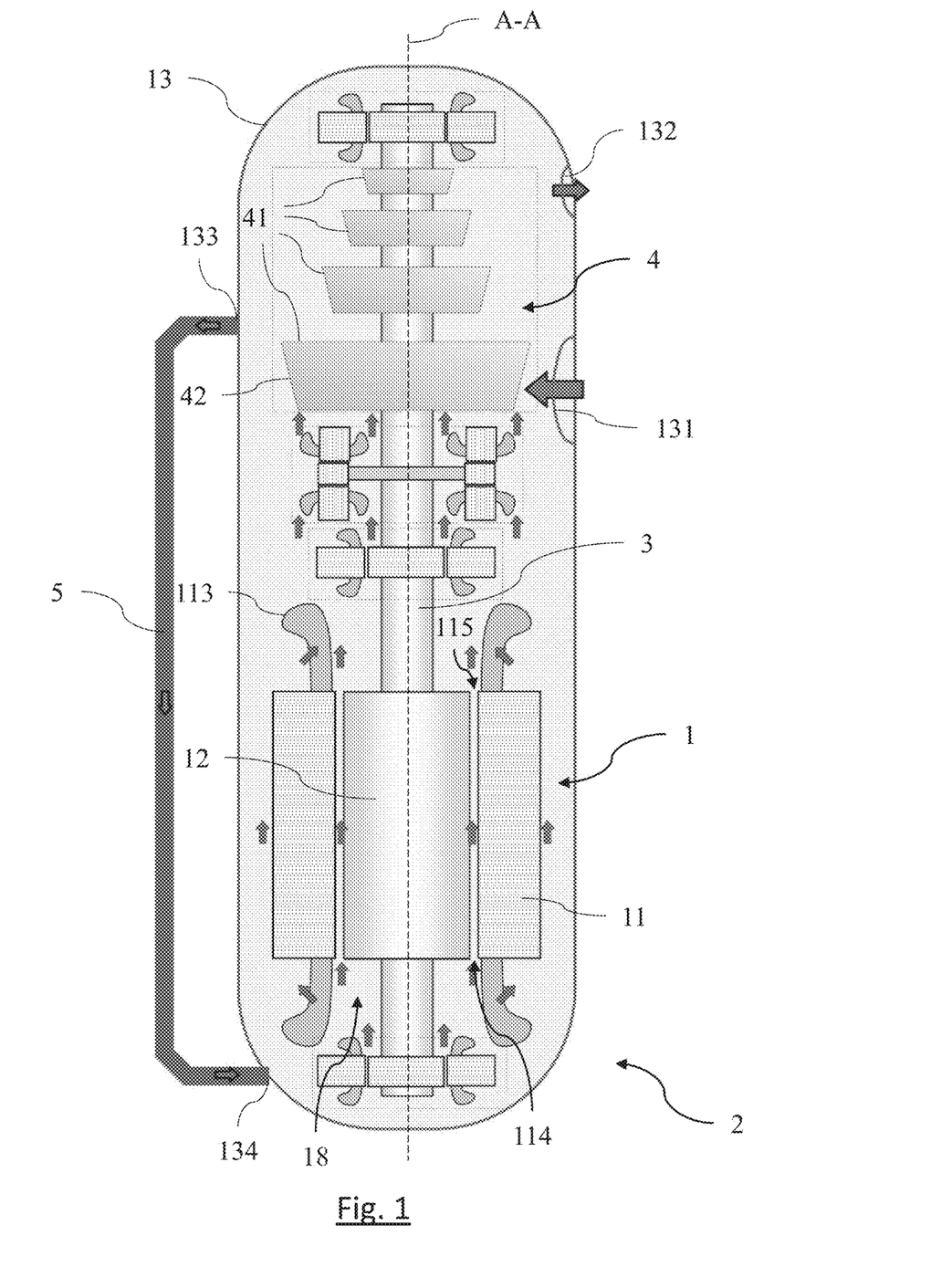
FIG. 1 shows an in-line motor-compressor apparatus according to the present invention.
Figure 2:
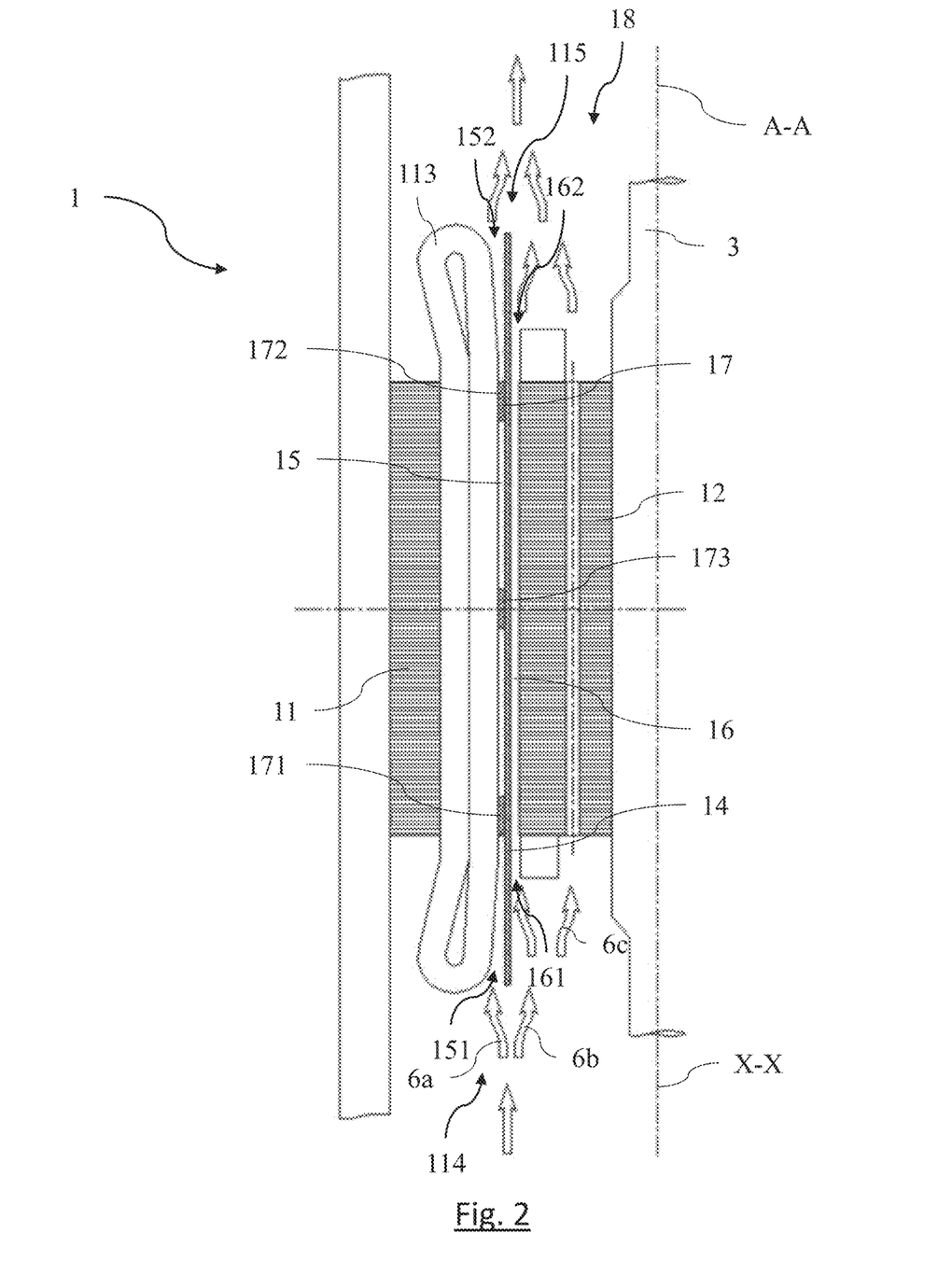
FIG. 2 shows a section of an electric motor of the apparatus of FIG. 1.
Figure 3:
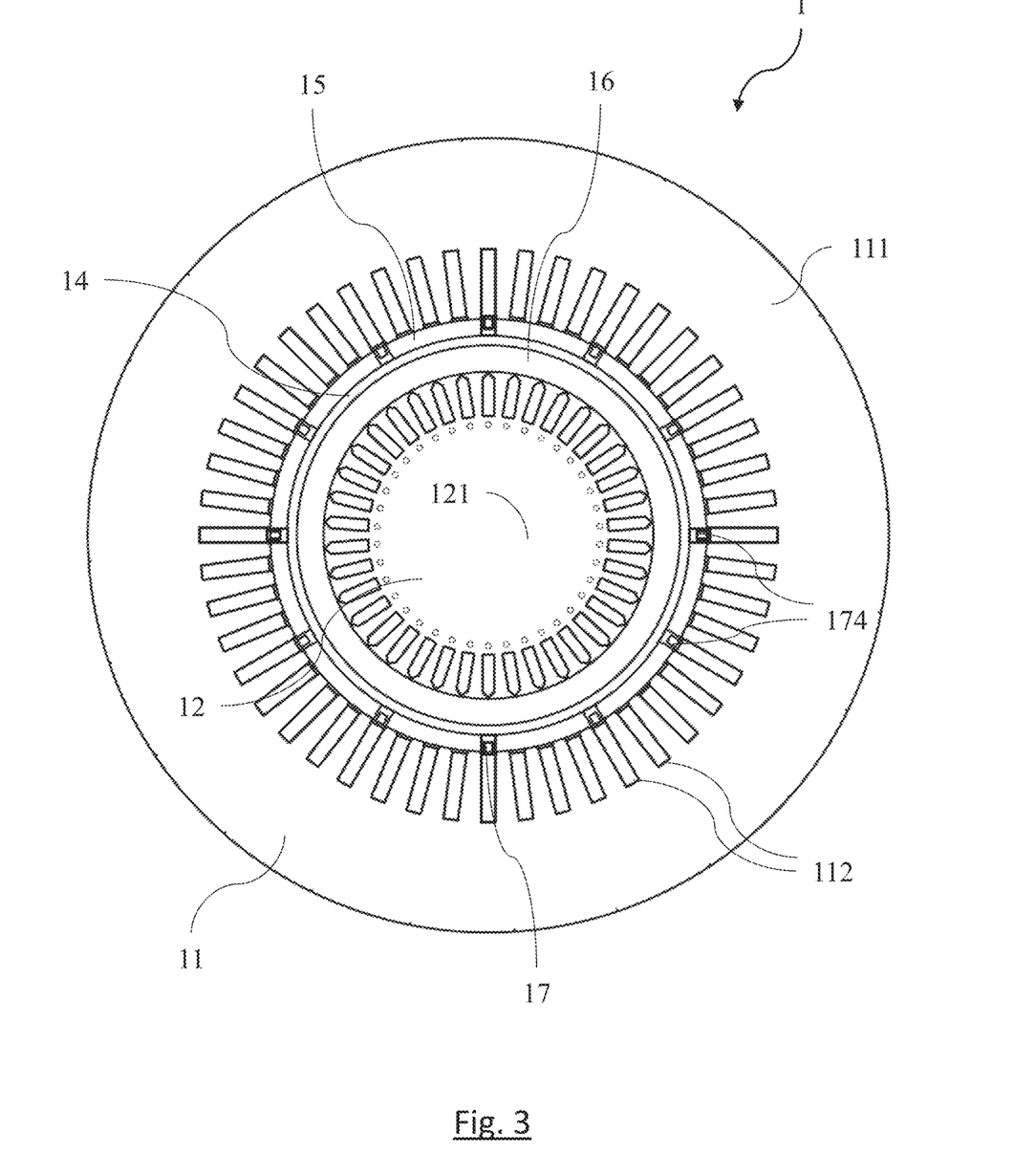
FIG. 3 shows a different section of the electric motor of FIG. 2.
Figure 4:
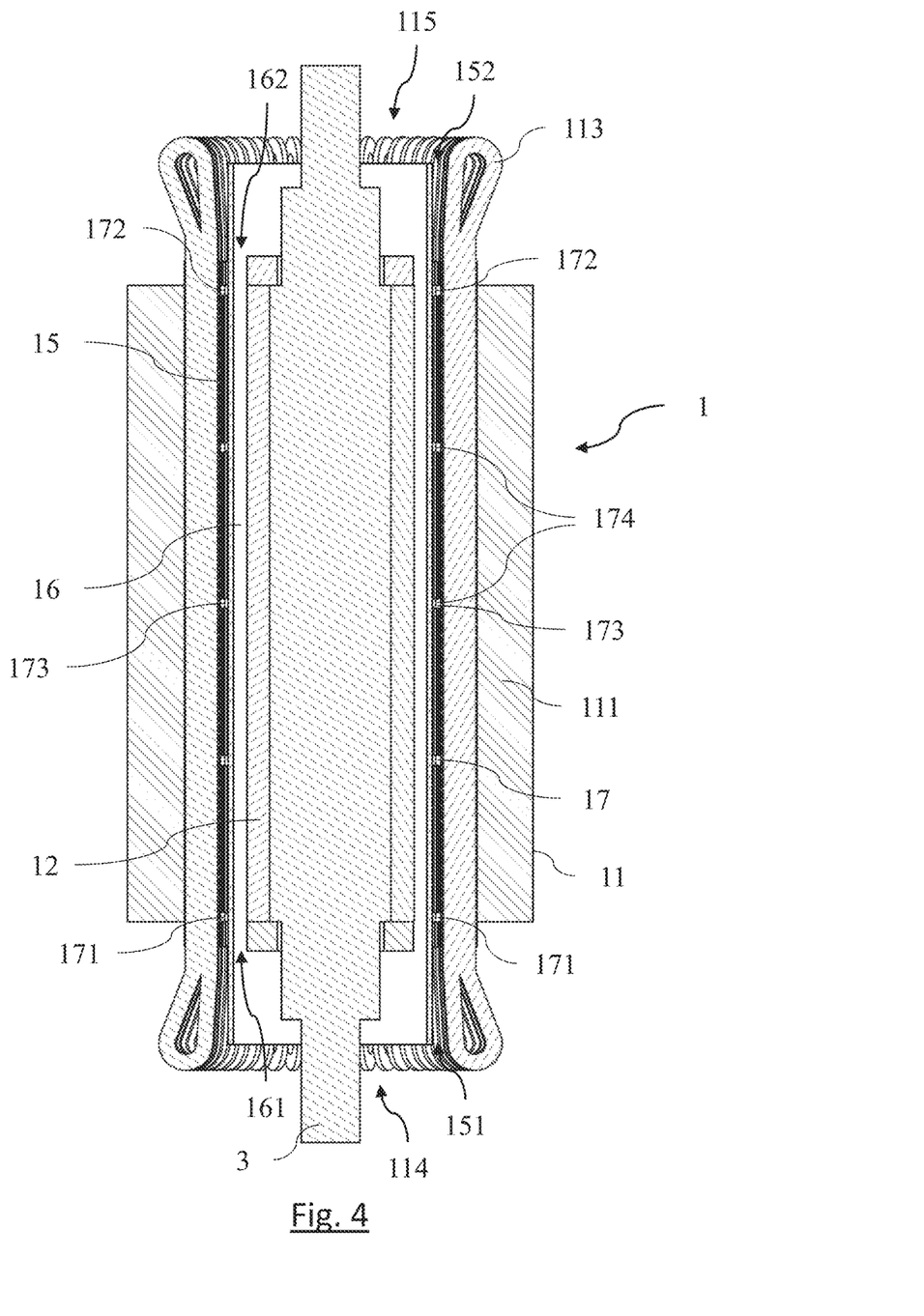
FIG. 4 shows a different section of the electric motor of FIG. 2.

FIG. 1 shows an electric motor 1 according to one embodiment of the present invention. The electric motor 1 is preferably a synchronous motor or an induction motor. The electric motor 1 comprises a stator 11 and a rotor 12. The stator 11 has a stator cavity 18, preferably cylindrical, with an axis A-A extending in a longitudinal direction X-X. The rotor 12 is arranged inside the stator cavity 18, and is rotatable around the axis A-A.

The stator 11 has an inner surface facing inside the stator cavity 18 and an opposite outer surface. The stator 11 comprises a stator core 111, preferably made of a laminated ferromagnetic material, having a first end portion and a second end portion spaced apart in the longitudinal direction X-X. The stator 11 comprises a plurality of stator slots 112, each stator slot 112 extending in the longitudinal direction X-X, for the entire longitudinal extension of the stator core 111, each stator slot 112 having a slot opening at the inner surface of the stator 11. The stator 11 comprises a stator winding 113 having conductors, at least partially extending through the stator slots 112 in a known manner. It shall be noted that the stator winding 113 can also protrude in the longitudinal direction X-X outside the stator core 111.

The rotor 12 has an outer surface facing the stator inner surface, the rotor outer surface being preferably smooth, with non salient poles. The rotor 12 rises a rotor core 121, made of a bulk or laminated ferromagnetic material and having a longitudinal extension preferably equal to the longitudinal extension of the stator core 111. The rotor 12 has a plurality of rotor slots extending in the longitudinal direction X-X, and a rotor winding and/or permanent magnets and/or a squirrel cage.

Since the stator winding 113 protrudes from the stator core 111, the stator 11 has usually a longitudinal extension higher than the longitudinal extension of the rotor 12.

The electric motor 1 is configured such that applying alternated voltages and/or currents to the stator winding 113 generates a magnetic field inside the stator cavity 18 and makes the rotor 12 rotate.

As will be described in greater detail, the electric motor 1 according to the present invention is suitable for working immersed in a fluid which generates high friction losses between the stator inner surface and the rotor outer surface. In particular, the electric motor 1 is suitable for working at a high angular speed immersed in a fluid that, at the particular working conditions such as pressure and temperature, exhibits high viscosity features.

The fluid is preferably a gas, and the particular angular speed and working conditions causing the high friction losses depend on the nature of the gas. For example, if the fluid is methane, which is commonly perceived as a fluid with a low viscosity, conditions of high viscosity can be met at a pressure between 80 and 100 bar, for example 85 bar, and a temperature between 20° C. and 50° C. The high angular speed causing high friction losses can be between 2000 rpm and 20000 rpm, for example 10000 rpm. If the fluid is R134A, high viscosity conditions can be met at a pressure of 3 bar and a temperature of 40° C.

The stator cavity 18 has a stator inlet 114 for receiving the fluid and a stator outlet 115 for discharging the fluid, such that the fluid can flow from the stator inlet 114 to the stator outlet 115 through the stator cavity 18 between the stator inner surface and the rotor outer surface, and eventually in additional channels, as it will be described in greater detail.

According to an aspect, the electric motor 1 comprises a tubular sleeve 14. The tubular sleeve 14 is arranged between the stator 11 and the rotor 12, coaxial with the axis A-A. The tubular sleeve 14 is spaced from the stator 11 by a first tubular gap 15, and from the rotor 12 by a second tubular gap 16. Preferably, the tubular sleeve 14 has a radial distance constant from the rotor 12 along the longitudinal extension of the rotor 12, and a radial distance constant from the stator 11 along the longitudinal extension of the stator core 111 (i.e., the first and second tubular gaps 15, 16 have a substantially constant width). Radial distance is meant to be a distance measured along a radial direction perpendicular to the axis A-A.

The first tubular gap 15 and the second tubular gap 16 are contiguous in the radial direction, the first tubular gap 15 surrounding the second tubular gap 16. The tubular sleeve 14 has an outer surface facing the stator inner surface, and an inner surface facing the rotor outer surface. Preferably, the outer and inner surfaces of the tubular sleeve 14 are smooth, in order to have a low friction with the flowing fluid.

The tubular sleeve 14 is attached to the stator 11 through attachment members 17. Consequently, the tubular sleeve 14 is fixed, and does not rotate jointly with the rotor 12.

The first tubular gap 15 extends along the longitudinal direction X-X between a first gap inlet 151 and a first gap outlet 152, and similarly the second tubular gap 16 extends along the longitudinal direction X-X between a second gap inlet 161 and a second gap outlet 162. The first and second gap inlets and outlets 151, 152, 161, 162 have preferably a circular crown shape.

The first and second gap inlets 151, 161 are in direct fluid communication with the stator inlet 114, and the first and second gap outlets 152, 162 are in direct fluid communication with the stator outlet 115. The fluid entering the stator cavity 18 at the stator inlet 114 therefore divides into first fluid flow 6a and a second fluid flow 6b, respectively flowing through the first tubular gap 15 and the second tubular gap 16, and exiting the stator cavity 18 at said stator outlet 115.

Preferably, the tubular sleeve 14 extends in the longitudinal direction X-X for at least the longitudinal extension of the rotor 12. Therefore, the first fluid flow 6a and the second fluid flow 6b cannot mix until they have passed any rotating part of the electrical motor 1. More preferably the tubular sleeve 14 extends longitudinally for at least the longitudinal extension of the stator 11. Consequently, the second fluid flow 6b, even after having left behind the rotor 12, does not contact the stator 11, and in particular its stator winding 113 protruding from the stator core 111. Other possibilities are allowed, such as in case of tubular sleeve 14 longitudinally extending from a first end portion of the stator core 113 to the opposite stator end corresponding to the stator winding 113 protruding from the second end portion of the stator core 111.

The longitudinal extension of the tubular sleeve 14 shall be adapted to allow the fluid entering the first tubular gap 15 and the second tubular gap 16. The radial extension of the first tubular gap 15, the second tubular gap 16 and the tubular sleeve 14 shall be adapted to divide the fluid into the first fluid flow 6a and the second fluid flow 6b according to predetermined proportions.

For example, the radial distance between the stator inner surface and the rotor outer surface can be 12 mm, where the tubular sleeve 14 is 3 mm thick, the first tubular 15 gap is 3 mm in width, and the second tubular gap 16 is 6 mm in width.

It shall be noted that the first fluid flow 6a and the second fluid flow 6b are mixed until reaching the tubular sleeve 14, and mix again just after leaving the tubular sleeve 14. Consequently, the first fluid flow 6a and the second fluid flow 6b are advantageously at the same pressure for all the longitudinal extension of the first tubular gap 15 and of the second tubular gap 16. Therefore, the inner and outer surfaces of the tubular sleeve 14 are never subject to different pressures, independently of the working conditions of the fluid, also in case of sudden variations in the speed and pressure of the fluid. The electric motor 1 is therefore particularly suitable for working immersed in a high pressure fluid.

The tubular sleeve 14 is made of a thermal insulating material, thereby thermally insulating the first tubular gap 15 from the second tubular gap 16. Advantageously, the second fluid flow 6b, which is in contact with the rotor 12 and has a turbulent flow with high friction losses, does not give his heat to the stator 11 of the electrical machine 1, or gives it only in a minimal part. Instead, the first fluid flow 6a is not in contact with any rotating part of the machine, and therefore has low friction losses and an acceptable temperature.

Even if a minor amount of heat can flow from the second fluid flow 6b to the stator 11 through the tubular sleeve 14 and the first fluid flow 6a, the electrical machine 1 according to the present invention has lower stator temperatures and higher rotor temperatures if compared to known electric machines. This is advantageous since the stator 11 is generally more temperature sensitive than the rotor 12, and consequently the whole electric machine 1 and/or its cooling system can be sized more conveniently. It is also possible that the first fluid flow 6a provides alone the cooling needed by the electric machine. With a decreasing of the stator temperature, the electric machine can be realised with a higher longitudinal extension and a lower radial extension with respect to known electric motors, thereby further reducing friction losses with a same power output.

However, the stator 11 and/or the rotor 12 can comprise a plurality of channels extending in the longitudinal direction X-X to allow a further cooling of the electrical motor 1.

Preferably, the tubular sleeve 14 is made of a material having further advantageous characteristics, such as electric insulation or high electric resistivity, in order to avoid eddy current losses in the tubular sleeve due to the variable magnetic field; low magnetic permeability, in order to avoid magnetic field dispersions; elasticity, in order to bend and not break in case of mechanical stresses; non-porousness, to reduce friction and avoid fluid flows through the tubular sleeve 14; a thermal expandability similar to that of the stator core; resistance to high isostatic pressures, high temperatures, and chemical aggressions. Such material is preferably glass fiber. The optimum combination of the aforementioned properties generally depends on the particular application.

Within the present application, the term "high electric resistivity" refers to an electric resistivity higher than $10^3$ $\Omega$-cm.

Preferably, the attachment members 17 comprise a plurality of groups of attaching elements 171, 172, 173, the groups of attaching elements 171, 172, 173 being spaced apart in the longitudinal direction X-X. Preferably, the plurality of groups of attaching elements comprises a first group of attaching elements 171 at the first end portion of the stator core 111, a second group of attaching elements 172 at the second end portion of the stator core 111, and a third group of attaching elements 173 arranged between the first and the second groups 171, 172 of attaching elements. Many other groups of attaching elements 171, 172, 173 can be provided between the first and the second group 171, 172 of attaching elements.

Advantageously, the tubular sleeve 14 is attached to the stator 11 not only at its end portions, but also in one or more intermediate positions. This avoids the radial deformation of the tubular sleeve 14 in case of pressure waves, particularly when the electric motor 1 has a high longitudinal extension. In fact, since the tubular sleeve 14 is spaced from the stator 11, it can bend and oscillate. Pressure waves at certain frequencies can cause a resonance and damage the tubular sleeve 14. Attaching the tubular sleeve 14 in more longitudinal positions increase its stability, and avoid resonances at low frequencies.

Preferably, each group of attaching elements 171, 172, 173 comprises a plurality of attaching elements 174 angularly spaced apart. The first fluid flow 6a can therefore flow between the attaching elements 174, and the tubular sleeve 14 can be sustained in all the directions. Preferably, each attaching element 174 is attached to the outer surface of the tubular sleeve 14 and to the inner surface of the stator 11 and engages, at least partially, a respective slot opening of the stator 11.

According to an aspect, a further object of this invention is an in-line motor compressor apparatus 2. The apparatus 2 comprises a housing 13 with a housing inlet 131 for receiving a fluid to be processed and a housing outlet 132 for discharging the processed fluid. The processed fluid can be for example a high viscosity fluid, such as methane or R134A in the working conditions described above. The apparatus 2 also s an electric motor 1 as described above.

The apparatus 2 further comprises a drive shaft 3, directly coupled to the rotor 12. The drive shaft 3 therefore rotates jointly with the rotor 12 (i.e., with the same angular velocity of the rotor 12 and around the axis A-A). The rotor 12 has a shaft opening extending longitudinally through the rotor core 121, and the drive shaft 3 extends through the shaft opening, and protrudes longitudinally from the rotor core. The drive shaft 3 is rotatably coupled to the housing 13, for example by means of mechanical bearings or active magnetic bearings, the latter being adapted to reduce friction. Preferably, the bearings are further configured to hinder a longitudinal movement of the drive shaft 13.

The apparatus 2 moreover comprises a compressor 4, directly coupled to the drive shaft 3. It shall be noted that the compress r 4, the drive shaft 3, and the electrical motor 1 are all arranged inside the housing 13 of the apparatus 2. Therefore, all of them are immersed in the fluid.

The compressor 4 is configured to receive the fluid to be processed from the housing inlet 131, process the fluid to be processed received, and discharge the processed fluid through said housing outlet 132. It is to be understood that the pressure of the fluid is generally higher for the processed fluid at the housing outlet 132 than for the fluid to be processed at the housing inlet 131, raising through the compressor 4, and preferably always remaining at high pressure. For example, and particularly in case of methane application, the fluid to be processed can be at a pressure of 80 bar, while the processed fluid can be at a pressure of 100 bar.

The compressor 4 is preferably a high speed compressor, for example a compressor 4 configured to rotate at an angular velocity between 2000 rpm to 20000 rpm, for example 10000 rpm.

Preferably, no gearbox is interposed between the rotor 12 of the electric motor 1 and the compressor 4, and the electric motor 1 must rotate at the same angular velocity of the compressor 4, possibly causing high friction losses. In order to enable the electric motor 1 reaching similar high angular velocity, the stator winding 113 can be supplied with voltage and/or current for example by a variable frequency electric converter, or an electric converter of any kind configured to enable a high speed rotation of the rotor 12. The electric converter is preferably disposed outside the housing 13.

Preferably, the compressor 4 comprises a plurality of compressing stages 41 for processing the fluid to be processed. The plurality of compressing stages 41 comprises a first compressing stage 42 receiving directly the fluid to be processed through the housing inlet 131. Preferably, a recirculating portion of the fluid to be processed by the compressor 4 is drawn off the compressor 4 at the first compressing stage 42, and recirculated in the housing 13 to provide a cooling effect on the stator 11 as is described hereinafter.

The housing 13 has a first recirculation opening 133 proximate the first compressing stage 42, and a second recirculation opening 134 proximate the stator inlet 114. A recirculation conduit 5 extends between the first recirculation opening 133 and the second recirculation opening 134, such that the recirculating portion of the fluid to be processed is drawn from the first compressing stage 42 to the stator inlet 114 through the recirculation conduit 5.

It is to be noted that the fluid drawn at the first compressing stage 42 can be, particularly in methane applications, at a pressure of 85 bar, i.e. substantially at the same pressure of the fluid flowing in the stator cavity 18, awhile the fluid to be processed can be at 80 bar and the processed fluid can be at 100 bar.

According to different embodiments, the recirculating portion of fluid to be processed can be drawn from compressing stages 41 different from the first compressing stage 42, with obvious structural modifications in the position of the first recirculating opening 133. However, it is preferred to draw the recirculating portion from the first compressing stage 42 since it is the compressing stage 41 with the lowest pressure and since the fluid drawn from the first stage has received the minimum amount of mechanical work from the compressor 4. It is to be noted that the work made on the recirculating portion is partially lost.

Consequently, the compressor 4 processes the fluid to be processed, forcing it to move such that a main portion of the fluid to be processed flows from the housing inlet 131 through the compressor 4 to the housing outlet 132. The recirculating portion of the fluid to be processed instead is drawn from the first compressing stage 42, and forced to the first recirculating opening 133, through the recirculating conduit 5, to the second recirculating opening 134, and to the stator inlet 114. There, the recirculating portion divides into the first fluid flow 6a, the second fluid flow 6b, and eventually other fluid flows 6c, The first and second fluid flows 6a, 6b flow respectively through the first tubular gap 15 and the second tubular gap 16, while other fluid flows 6c can pass, for example, in the stator or rotor channels. While the second fluid flow 6b heats the rotor 12, the first fluid flow 6a cools the stator 11 and the other fluid flows 6c eventually cool the stator 11 and/or the rotor 12. Finally, the first, second and other fluid flows 6a, 6b, 6c mix together at the stator outlet 115, and the fluid discharged from the stator outlet 115 is fed again to the first compressing stage 42.

Obviously, a person skilled in the art can apply many variations to the particular embodiment of the invention described, without departing from the scope of protection as defined by the appended claims.

The invention claimed is:

1. An electric motor, comprising:
a stator having a stator cavity with an axis extending in a longitudinal direction, said stator cavity having a stator inlet for receiving a fluid and a stator outlet for discharging said fluid,
a rotor arranged inside the stator cavity and rotatable around said axis, and
a tubular sleeve, arranged between the stator and the rotor, coaxial with said axis, and attached to the stator through attachment members,
wherein:
the tubular sleeve is spaced from the stator by a first tubular gap, and from the rotor by a second tubular gap,
the first tubular gap extends along the longitudinal direction between a first gap inlet and a first gap outlet,
the second tubular gap extends along the longitudinal direction between a second gap inlet and a second gap outlet,
the first and second gap inlets are in direct fluid communication with the stator inlet, and the first and second gap outlets are in direct fluid communication with the stator outlet, such that the fluid entering the stator cavity at said stator inlet divides into a first fluid flow and a second fluid flow respectively flowing through the first tubular gap and the second tubular gap and exiting the stator cavity at said stator outlet, and
the tubular sleeve is entirely made of a thermally insulating and non-ferromagnetic material, thereby thermally insulating the first tubular gap from the second tubular gap, said tubular sleeve having an electrical resistivity higher than $10^3$ Ω-cm.

2. The electric motor as claimed in claim 1, wherein:
the attachment members comprise a plurality of groups of attaching elements, the groups of the attaching elements being spaced apart in the longitudinal direction.

3. The electric motor as claimed in claim 2, wherein:
said stator comprises a stator core made of a ferromagnetic material, having a first end portion and a second end portion spaced apart in the longitudinal direction, and
said plurality of groups of attaching elements comprises a first group of attaching elements at the first end portion of the stator core, a second group of attaching elements at the second end portion of the stator core, and a third group of attaching elements arranged between the first and the second group of attaching elements.

4. The electric motor as claimed in claim 2, wherein:
each group of the attaching elements comprises a plurality of the attaching elements angularly spaced apart.

5. The electric rotor as claimed in claim 4, wherein:
said tubular sleeve has an inner surface facing an outer surface of the rotor and an outer surface facing an inner surface of the stator, and
each of the attaching elements is attached to the outer surface of the tubular sleeve and to the inner surface of the stator.

6. The electric motor as claimed in claim 5, wherein:
the stator has a stator winding and a plurality of stator slots, the stator winding extending longitudinally through the stator slots, each of the stator slots having a slot opening at the inner surface of the stator, and
each of the attaching elements engages a respective slot opening.

7. The electric motor as claimed in claim 1, wherein the thermally insulating and non-ferromagnetic material is glass fiber.

8. The electric motor as claimed in claim 1, wherein said tubular sleeve extends longitudinally for at least a longitudinal extension of the rotor.

9. The electric motor as claimed in claim 1, wherein said tubular sleeve extends longitudinally for at least a longitudinal extension of the stator.

10. The electric motor as claimed in claim 1, wherein said tubular sleeve has a radial distance from the rotor constant along a longitudinal extension of the rotor.

11. An in-line motor compressor apparatus, comprising:
a housing with a housing inlet for receiving a fluid to be processed and a housing outlet for discharging the processed fluid,
an electric motor comprising:
a stator having a stator cavity with an axis extending in a longitudinal direction, said stator cavity having a stator inlet for receiving said fluid and a stator outlet for discharging said fluid, a rotor arranged inside the stator cavity and rotatable around said axis, and a tubular sleeve, arranged between the stator and the rotor, coaxial with said axis, and attached to the stator through attachment members, wherein:

the tubular sleeve is spaced from the stator by a first tubular gap, and from the rotor by a second tubular gap, the first tubular gap extends along the longitudinal direction between a first gap inlet and a first gap outlet, the second tubular gap extends along the longitudinal direction between a second gap inlet and a second gap outlet, the first and second gap inlets are in direct fluid communication with the stator inlet, and the first and second gap outlets are in direct fluid communication with the stator outlet, such that the fluid entering the stator cavity at said stator inlet divides into a first fluid flow and a second fluid flow respectively flowing through the first tubular gap and the second tubular gap and exiting the stator, cavity at said stator outlet, the tubular sleeve is entirely made of a thermally insulating and non-ferromagnetic material, thereby thermally insulating the first tubular gap from the second tubular gap, said tubular sleeve having an electrical resistivity higher than $10^3$ Ω-cm, a drive shaft directly coupled to said rotor, and a compressor directly coupled to said drive shaft, wherein:

said compressor and said electric motor are arranged inside said housing, and said compressor is configured to receive said fluid to be processed from said housing inlet, process said fluid to be processed, and discharge the processed fluid through said housing outlet.

12. The in-line motor compressor apparatus as claimed in claim 11, wherein:

said compressor comprises a plurality of compressing stages for processing said fluid to be processed, said plurality of compressing stages comprises a first compressing stage receiving directly the fluid to be processed through said housing inlet, said housing has a first recirculation opening proximate said first compressing stage, and a second recirculation opening proximate said stator inlet, a recirculation conduit extends between said first recirculation opening and said second recirculation opening, such that a recirculating portion of said fluid to be processed by the compressor is drawn from said first compressing stage to the stator inlet through said recirculation conduit, and said fluid discharged from said stator outlet is fed to said first compressor stage.

13. An electric motor, comprising:

a stator having a stator cavity with an axis extending in a longitudinal direction, said stator cavity having a stator inlet for receiving a fluid and a stator outlet for discharging said fluid, a rotor arranged inside the stator cavity and rotatable around said axis, and a tubular sleeve, arranged between the stator and the rotor, coaxial with said axis, the tubular sleeve having a cylindrical portion, and the cylindrical portion of the tubular sleeve being attached to the stator through attachment members, wherein:

the tubular sleeve is spaced from the stator by a first tubular gap, and from the rotor by a second tubular gap, the first tubular gap extends along the longitudinal direction between a first gap inlet and a first gap outlet, the second tubular gap extends along the longitudinal direction between a second gap inlet and a second gap outlet, the first and second gap inlets are in direct fluid communication with the stator inlet, and the first and second gap outlets are in direct fluid communication with the stator outlet, such that the fluid entering the stator cavity at said stator inlet divides into a first fluid flow and a second fluid flow respectively flowing through the first tubular gap and the second tubular gap and exiting the stator cavity at said stator outlet, the tubular sleeve is made of a thermally insulating material, thereby thermally insulating the first tubular gap from the second tubular gap, said tubular sleeve having an electrical resistivity higher than $10^3$ Ω-cm, and the attachment members comprise a plurality of groups of attaching elements, the groups of the attaching elements being spaced apart in the longitudinal direction.

14. The electric motor as claimed in claim 13, wherein:

said stator comprises a stator core made of a ferromagnetic material, having a first end portion and a second end portion spaced apart in the longitudinal direction, and said plurality of groups of attaching elements comprises a first group of attaching elements at the first end portion of the stator core, a second group of attaching elements at the second end portion of the stator core, and a third group of attaching elements arranged between the first and the second group of attaching elements.

15. The electric motor as claimed in claim 13, wherein:

each group of the attaching elements comprises a plurality of the attaching elements angularly spaced apart.

16. The electric motor as claimed in claim 15, wherein:

said tubular sleeve has an inner surface facing an outer surface of the rotor and an outer surface facing an inner surface of the stator, and each of the attaching elements is attached to the outer surface of the tubular sleeve and to the inner surface of the stator.

17. The electric motor as claimed in claim 16, wherein:

the stator has a stator winding and a plurality of stator slots, the stator winding extending longitudinally through the stator slots, each of the stator slots having a slot opening at the inner surface of the stator, and each of the attaching elements engages a respective slot opening.

18. The electric motor as claimed in claim 13, wherein the thermally insulating material is glass fiber.

19. The electric motor as claimed in claim 13, wherein said tubular sleeve extends longitudinally for at least a longitudinal extension of the rotor.

20. The electric motor as claimed in claim 13, wherein aid tubular sleeve extends longitudinally for at least a longitudinal extension of the stator.

* * * * *